(12) United States Patent
Lavallee

(10) Patent No.: US 10,789,539 B2
(45) Date of Patent: Sep. 29, 2020

(54) PROBABILISTIC RANKING FOR NATURAL LANGUAGE UNDERSTANDING

(71) Applicant: Nuance Communications, Inc., Burlington, MA (US)

(72) Inventor: Jean-Francois Lavallee, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 1023 days.

(21) Appl. No.: 15/291,325

(22) Filed: Oct. 12, 2016

(65) Prior Publication Data
US 2017/0193387 A1     Jul. 6, 2017

Related U.S. Application Data

(60) Provisional application No. 62/274,073, filed on Dec. 31, 2015.

(51) Int. Cl.
| | |
|---|---|
| *G06N 7/00* | (2006.01) |
| *G06F 16/332* | (2019.01) |
| *G06F 40/40* | (2020.01) |

(52) U.S. Cl.
CPC ......... *G06N 7/005* (2013.01); *G06F 16/3329* (2019.01); *G06F 40/40* (2020.01)

(58) Field of Classification Search
CPC .................................................... G06N 7/005
USPC .......................................................... 706/46
See application file for complete search history.

(56) References Cited

U.S. PATENT DOCUMENTS

| | | | |
|---|---|---|---|
| 10,192,166 B2 * | 1/2019 | Lewis | G06N 7/005 |
| 2003/0191726 A1 * | 10/2003 | Kirshenbaum | G06N 3/086 |
| | | | 706/12 |
| 2005/0044055 A1 * | 2/2005 | Iyer | G01R 31/318307 |
| | | | 706/46 |
| 2007/0124263 A1 | 5/2007 | Katariya et al. | |
| 2009/0138422 A1 * | 5/2009 | Ghaseminejad Tafreshi ............... |
| | | | G06Q 10/00 |
| | | | 706/46 |
| 2009/0228472 A1 * | 9/2009 | Taylor | G06F 16/217 |
| 2012/0323554 A1 | 12/2012 | Hopkins et al. | |

(Continued)

OTHER PUBLICATIONS

Mar. 31, 2017—(WO) International Search Report & Written Opinion—App PCT/US2016/067232.

*Primary Examiner* — James D. Rutten
(74) *Attorney, Agent, or Firm* — Brian J. Colandreo; Michael T. Abramson; Holland & Knight LLP

(57) ABSTRACT

Aspects of the disclosure are directed to natural language processing or natural language understanding and may include a determination of a probabilistic or probability-based ranking of potential results. For example, natural language input may be received such as speech or text. Natural language processing may be performed to determine one or more potential results for the input. A pairwise classifier may be used to determine a score for element pairs in the potential results. Based on the scores, probabilities for the element pairs may be determined. Based on the probabilities for the element pairs, further probabilities may be determined such as by estimating the probability that a current result is the top rank or best choice. Based on the estimated probabilities that the current result is the top rank or best choice, a ranking may be determined, which may form the basis for natural language understanding output.

20 Claims, 5 Drawing Sheets

(56) References Cited

U.S. PATENT DOCUMENTS

2014/0108842 A1* 4/2014 Frank ...................... G06F 17/28
  713/323
2014/0163959 A1 6/2014 Hebert et al.
2015/0356451 A1* 12/2015 Gupta .................... G06N 20/00
  706/52
2016/0267085 A1* 9/2016 Prager ............... G06F 16/24522

* cited by examiner

PROBABILISTIC RANKING FOR NATURAL LANGUAGE UNDERSTANDING

CROSS-REFERENCE TO RELATED APPLICATIONS

The present application claims the benefit of U.S. provisional application 62/274,073, filed Dec. 31, 2015, and having the same title. The above-mentioned application is incorporated herein by reference in its entirety.

TECHNICAL FIELD

The present application generally relates to natural language processing or natural language understanding. Additionally, the present application relates to using a probabilistic or probability-based ranking of potential results determined by a natural language processing or understanding system.

BACKGROUND

Natural language understanding systems often receive natural language input and determine natural language understanding output that is responsive to the natural language input in some manner. Due to the ambiguous nature of language, it is common to determine a list of hypotheses or potential results in response to received natural language input. To enable a more informed decision as to which potential result is the correct or best choice, processes that rank or score the potential results may be performed. Common processes used to rank or score potential results can be categorized in various groups including, for example, pointwise-based processes, pairwise-based processes and listwise-based processes.

Pointwise-based processes may produce a score for each element in the potential results independently from other results. Pointwise-based processes are often simple to implement but are considered as having lower accuracy because the produced scores do not consider any relationship between the elements of the potential results.

Listwise-based processes often attempt to form a ranking or score based on the semantic relationships between all elements of a list. This makes them difficult to implement. Models become complex due to the high number of variables involved, and the risk of learning a false pattern is exacerbated due to the large amount of features. Theoretically, however, listwise-based processes can produce greater accuracy if proper models can be developed and proper training can be performed.

Pairwise-based processes rank or score by comparing elements in pairs. While typically considered more complex to implement than pointwise-based processes, pairwise-based processes are often considered a compromise between ease of implementation of pointwise-based approaches and listwise-based approaches. Pairwise-based processes also have some drawbacks. For example, pairwise-based processes may not be able to avoid a cycle causing your determined score or rank to be considered unreliable. Pairwise-based processes may produce a ranking that is conditioned upon the comparison order of the classifier (e.g., a different comparison order would cause a different ranking to be determined). Additionally, the scores of a pairwise-based process by virtue of being a comparison between two elements may be difficult to use as a meaningful score for the ranking as a whole.

In light of the various drawbacks for each of the common approaches to ranking or scoring potential results for natural language understanding systems, there is an ever present need to improve on the processes for ranking and scoring results for natural language processes.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome the challenges discussed above, and to overcome other challenges that will be apparent upon reading and understanding the present specification, aspects described herein advantageously overcome shortcomings of commonly used techniques to score and rank potential results of a natural language understanding system. Advantages provided by the techniques described herein include, for example, the ability to determine, based on scores determined from a pairwise classifier, more useful listwise probabilistic scores that include additional information about the relationships between the various elements of the potential results; the ability to use the probabilistic values in a way that is amendable to being used by other ranking processes or for simple heuristics; and the ability to minimize many of the drawbacks commonly seen in pairwise-based processes by, for example, determining a quality measurement of a prediction or by, for example, removing the impact of the comparison order. According to some aspects, the quality measurement may be based on a probability of a cycle.

Some aspects described herein include embodiments or arrangements that receive natural language input; determine a list of potential results based on the natural language input; determine, using a pairwise classifier, scores for element pairs determined from the list of potential results; determine, based on the scores for the element pairs, one or more pairwise probabilities for the elements pairs; determine, based on the one or more pairwise probabilities for the element pairs, an approximation of a probability that each result in the list of potential results is to be the top ranked result among the list of potential results, resulting in one or more top-rank probability approximations; determine, based on the one or more top-rank probability approximations, a ranking of the potential results; and after determining the ranking of the potential results, transmit natural language understanding output responsive to the natural language input.

Some aspects relate to embodiments or arrangements that determine a potential ranking for the potential results of a natural language understanding system; analyze the potential ranking to determine a probability of a cycle; and based on the probability of the cycle, select between processing the ranking of the potential results as the natural language understanding output or performing a different algorithm for determining the natural language understanding output.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
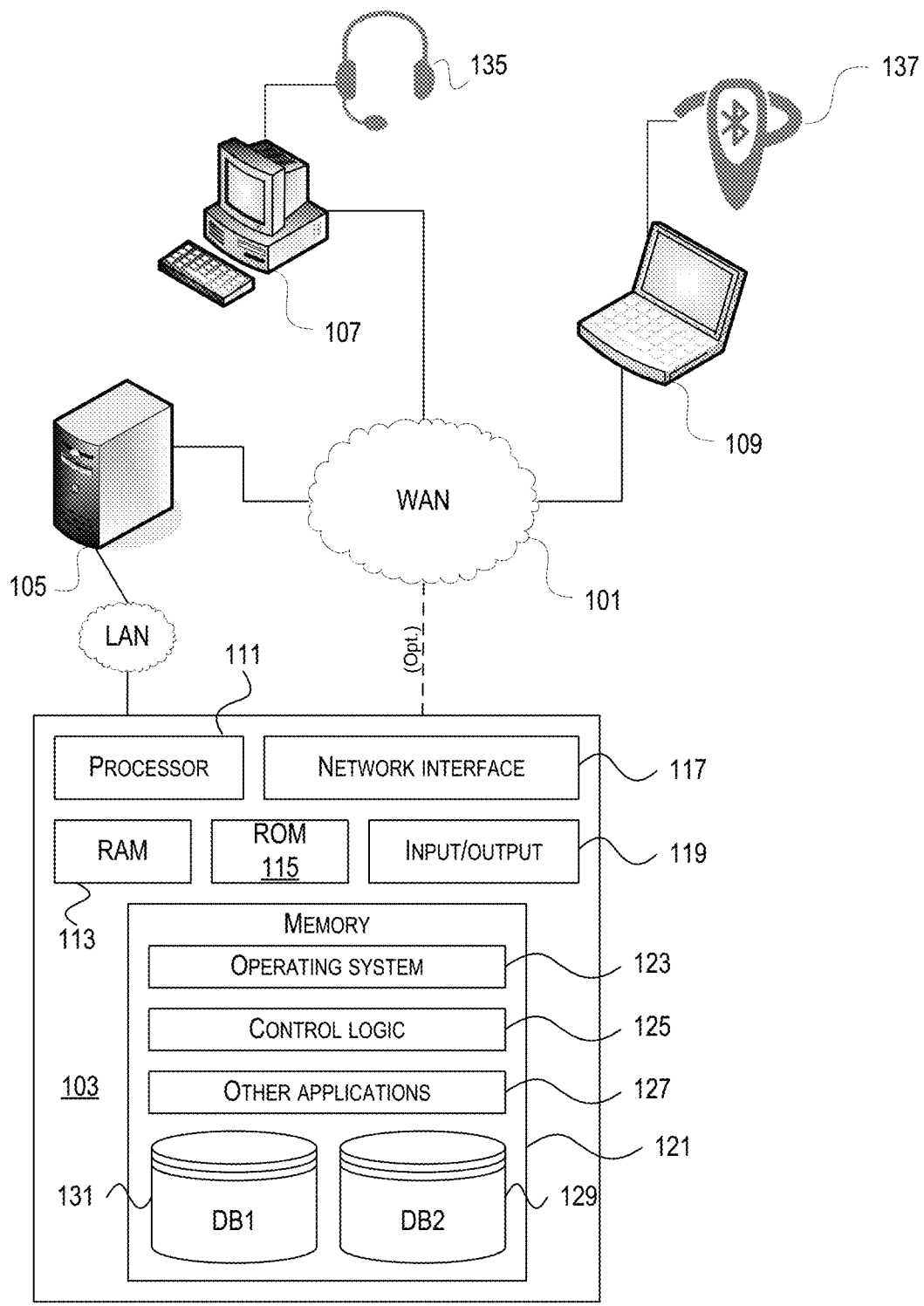
FIG. 1 depicts an illustrative computer system architecture that may be used in accordance with one or more illustrative aspects described herein.

In the following description of the various implementations, reference is made to the accompanying drawings identified above and which form a part hereof, and in which is shown by way of illustration various implementations in which aspects described herein may be practiced. It is to be understood that other implementations may be utilized and structural and functional modifications may be made without departing from the scope described herein. Various aspects are capable of other implementations and of being practiced or being carried out in various different ways.

As a general introduction to the subject matter described in more detail below, aspects described herein are directed toward processing natural language input, such as speech or text, to determine natural language understanding output, which can be used to respond to the natural language input in various ways.

As described in further detail below, due to the ambiguous nature of language, it is common to determine a list of hypotheses or potential results in response to a received natural language input. To enable a more informed decision as to which potential result is the correct or best choice, processes that rank or score the potential results may be performed. Common processes to rank or score potential results can be categorized into various groups including, for example, pointwise-based processes, pairwise-based processes and listwise-based processes. Pointwise-based processes are often simple to implement but have lower accuracy. Listwise-based processes often attempt to form a ranking or score based on the semantic relationships between all elements of a list. This, however, makes them difficult to implement, but can provide for greater accuracy and the elimination of certain risks, like cycles. Cycles will be described below in greater detail. Pairwise-based processes rank or score by comparing elements in pairs. While typically considered more complex to implement than pointwise-based processes, pairwise-based processes are often considered a compromise between ease of implementation of pointwise-based approaches and listwise-based approaches. Pairwise-based processes also have some drawbacks. For example, pairwise-based processes may not be able to avoid a cycle causing your determined score or rank to be unreliable. Pairwise-based processes may produce a ranking that is conditioned upon the comparison order of the classifier (e.g., a different comparison order would cause a different ranking to be determined). Additionally, the scores of a pairwise-based process by virtue of being a comparison between two elements may be difficult to use as a meaningful score for the ranking as a whole.

The aspects described herein advantageously overcome shortcomings of commonly used techniques to score and rank potential results of a natural language understanding system. Advantages provided by the techniques described herein include, for example, the ability to determine, based on scores determined from a pairwise classifier, more useful listwise probabilistic scores that include additional information about the relationships between the various elements of the potential results; the ability to use the probabilistic values in a way that is amendable to being used by other ranking processes or for simple heuristics; and the ability to compensate for many of the drawbacks commonly seen in pairwise-based processes by, for example, determining the quality of a prediction (e.g., by determining the probability of cycles) or by removing the impact of the comparison order.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

FIG. 1 illustrates one example of a network architecture and data processing device that may be used to implement one or more illustrative aspects of the disclosure. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects of the disclosure as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects of the disclosure as described herein, and other application software 127 providing secondary, support, and/or other functionality which may or might not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Client computers 107 and 109 may receive user speech commands using microphone 135 or Bluetooth headset 137. Client computer 107 may be connected to microphone 135 that detects user speech input that the client computer 107 may further process to receive user speech input for the dialog application. Similarly, client computer 109 may be in communication with a Bluetooth headset 137 that includes a microphone for detecting a user's speech commands for engaging in a dialog with the dialog system executed at least partially on client computer 109.

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
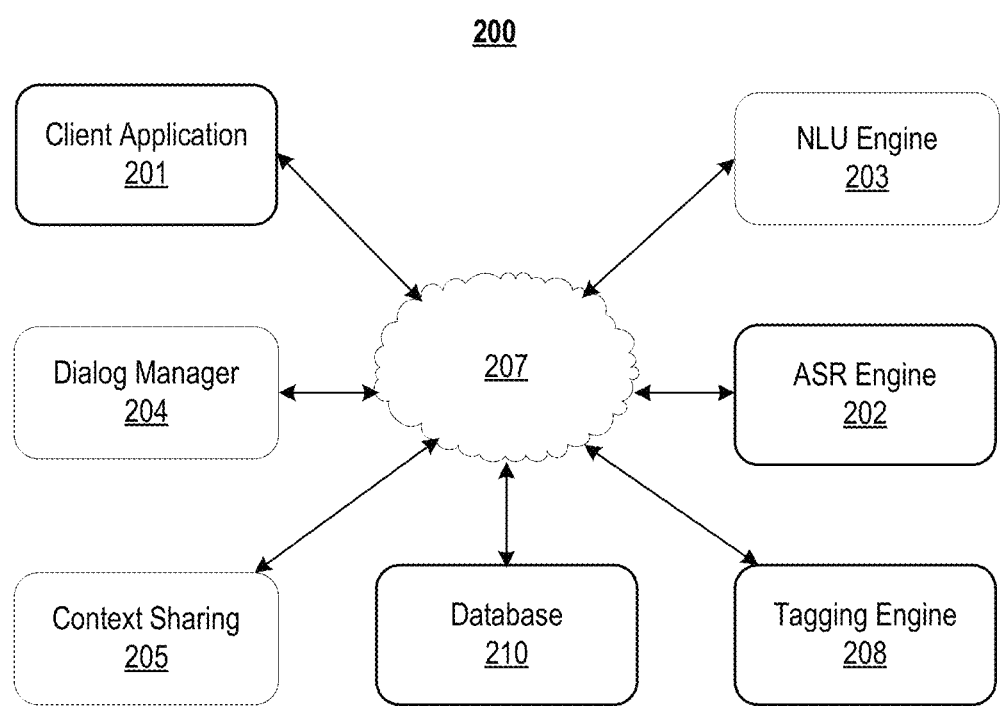
FIG. 2 depicts an illustrative natural language understanding system in accordance with one or more illustrative aspects described herein.

FIG. 2 depicts an illustrative system 200 that may implement one or more features described herein. System 200 may be a natural language understanding system, such as an automatic conversational system or a natural language automated dialog system. For example, system 200 may allow for a human-machine dialog arrangement and may have multiple computer-implemented dialog components for conducting an automated dialog process with a user or device. The arrangement depicted in FIG. 2 includes multiple computer-implemented dialog components, engines or modules, which may be configured to intercommunicate and use context to narrow down understanding, recognition, and/or reasoning errors. Additionally, various arrangements of system 200 may be configured to receive speech input or text input, and/or generate and store tagged data. The received input and/or tagged data may be used during the various processes of the components, engines or modules. The arrangement illustrated in FIG. 2 includes various components for both receiving speech input or text input and/or generating and storing tagged data.

A client application 201 may deliver output prompts to a human user and may receive natural language input, including speech inputs, from the human user. An automatic speech recognition (ASR) engine 202 may process the speech inputs to determine corresponding sequences of representative text words. A natural language understanding (NLU) engine 203 may process the text words to determine corresponding semantic interpretations. A dialog manager (DM) 204 may generate the output prompts and respond to the semantic interpretations so as to manage a dialog process with the human user. Context sharing module 205 may provide a common context sharing mechanism so that each of the dialog components—client application 201, ASR engine 202, NLU engine 203, dialog manager 204, tagging engine 208—may share context information with each other so that the operation of each dialog component reflects available context information. Components of system 200 may be located on or at one or more of the components of system 100, such as devices 103, 105, 107, 109. Components of system 200 may be interconnected or otherwise in communication with each other via one or more networks (e.g., LAN, WAN, etc.), such as network 207. In some arrangements, the components of system 200 are embodied on a single device. In others, the components of system 200 are distributed across different devices.

In some embodiments, ASR engine 202 may process the speech inputs of users to text strings using speech to text conversion algorithms. ASR engine 202 may constantly pay attention to user feedback to better understand the user's accent, speech patterns, and pronunciation patterns to convert the user speech input into text with a high degree of accuracy. For example, ASR engine 202 may monitor any user correction of specific converted words and input the user correction as feedback to adjust the speech to text conversion algorithm to better learn the user's particular pronunciation of certain words. The ASR engine 202 may be configured to generate input text when natural language input is received by the system 200, such as via a natural language interface of client application 201. For example, a natural language input interface may include a microphone and an analog-to-digital converter, may receive the input speech at the microphone, may generate a digital signal corresponding to the input speech using the analog-to-digital converter and may transmit the digital signal to the ASR engine 202. The ASR engine 202 may receive and process the digital signal to generate input text that corresponds to the digital signal. Having generated input text from the natural language input, the ASR engine may provide the input text to another component of system 200 for further processing, such as the dialog manager 204, the TE engine 208 or the NLU engine 203.

The NLU engine 203 may perform semantic analysis of text (e.g., the input text generated by ASR engine 202 or stored by database 210). For example, NLU engine 203 may identify semantic information in the text and generate natural language understanding output (e.g., a list or ranking of one or more words for display, a command to cause performance of a particular application function, or information usable for continuing a dialog with a user, such as a query for additional input). Having generated a natural language understanding output responsive to received natural language input (e.g., the input received via the client application 201 and processed by the ASR engine 202), the NLU engine 203 may transmit the natural language output to an application (e.g., client application 201). The application may, responsive to receiving the output, respond to the natural language understanding output in an appropriate manner (e.g., by displaying the natural language understanding output, by invoking some functionality the application is configured to perform in response to the natural language understanding output).

System 200 may comprise a tagging (TE) engine 208, which may process a transcription or query for tagging. TE 208 may leverage/process device and/or user metadata that may be stored in a database and/or on the device. For example, TE 208 may parse a string of words (e.g., using grammars, named entity processing, and/or internal concept processing) to determine whether any of the words in the string match any of the user metadata, such as a name in a contact list (e.g., a contact list stored on a user's device, such as a mobile phone). Thus, if a user states/inputs "call mom," TE 208 may parse the statement "call mom" to determine if mom is in the user's contact list. In such a case, TE 208 may identify "mom" as a named entity in the query of words. According to some aspects, TE 208 may annotate the identified named entity with a broader category. In such a case, "mom" may be a hyponym, and "local_contact" or "user_contact" may be a hypernym of the hyponym "mom." Thus, a tagging result may comprise the parsed string of "call [local_contact]" and the named entity of [local_contact="mom"]. The TE 208 may also perform other operations, such as information retrieval, syntactic analysis, and the like. The tagged data may be stored in one or more databases or caches, such as database 210

The database 210, which may be a storage memory and/or device, which may be used to store results output by TE 208 and results output by natural language understanding (NLU) engine 203 (discussed below). Database 210 may store the results output by TE 208 as keys, and may store results output by NLU 203 as corresponding values for those keys. Each key may correspond to a value, and each value may correspond to a key. These keys and values may be stored, for example, in a table. Database 210 may be a global cache, such that a plurality of devices may retrieve information to and/or transmit information from database 210. For example, database 210 may be located at a remote location, such as a server farm and/or a business location. Database 210 may also be located locally, such as on a user device. For example, a local cache may be accessed by the user device on which the cache is located. Database 210 may also be local and remote (e.g., one or more local caches and one or more remote caches). Database 210 may be configurable and/or aged. For example, the elements and/or entries (e.g., keys and values) may be configured to time out and/or expire at some time and/or after some time period, which may be predetermined or dynamically determined. For example, an entry may expire after a day or a few hours, but may also be extended depending on if the amount of times the entry is used or a frequency of use associated with the entry. In another example, the database 210 may be preconfigured with a key and/or value, such that a key and/or value may be added to the database 210. According to some aspects, there may be a plurality of databases, such as database 210, which may store a plurality of results output by TE 208 as keys, and may store a plurality of results output by NLU Engine 203 as corresponding values for these keys.

The context sharing module 205 may manage dialog context information of the dialog manager 204 based on maintaining a dialog belief state that represents the collective knowledge accumulated from the user input throughout the dialog. An expectation agenda may represent what new pieces of information the dialog manager 204 still expects to collect at any given point in the dialog process. The dialog focus may represent what specific information the dialog manager 204 just explicitly requested from the user, and similarly the dialog manager 204 may also track the currently selected items, which typically may be candidate values among which the user needs to choose for disambiguation, for selecting a given specific option (one itinerary, one reservation hour, etc.), and for choosing one of multiple possible next actions ("book now", "modify reservation", "cancel", etc.).

An example a dialog context protocol may be:
BELIEF=list of pairs of concepts (key, values) collected throughout the dialog where the key is a name that identifies a specific kind of concept and the values are the corresponding concept values. For example "I want to book a meeting on May first" would yield a BELIEF={(DATE, "2012/05/01"), (INTENTION="new_meeting")}.
FOCUS=the concept key. For example, following a question of the system "What time would you like the meeting at?", the focus may be START_TIME.
EXPECTATION=list of concept keys the system may expect to receive. For instance, in the example above, while FOCUS is START_TIME, EXPECTATION may contain DURATION, END_TIME, PARTICIPANTS, LOCATION, . . .
SELECTED_ITEMS: a list of key-value pairs of currently selected concept candidates among which the user needs to pick. Thus a dialog prompt: "do you mean Debbie Sanders or Debbie Xanders?" would yield to SELECTED_ITEMS {(CONTACT, Debbie Sanders), (CONTACT, Debbie Xanders)}.

Communicating the dialog context information back to the NLU engine 203 may enable the NLU engine 203 to weight focus and expectation concepts more heavily. And communicating such dialog context information back to the ASR engine 202 may allow for smart dynamic optimization of the recognition vocabulary, and communicating the dialog context information back to the client application 201 may help determine part of the current visual display on that device.

Similarly, the context sharing module 205 may also manage visual/client context information of the client application 201. One specific example of visual context would be when the user looks at a specific day of her calendar application on the visual display of the client application 201 and says: "Book a meeting at 1 PM," she probably means to book it for the date currently in view in the calendar application.

The client application 201 may also communicate touch input information via the context sharing module 205 to the dialog manager 204 by sending the semantic interpretations corresponding to the equivalent natural language command. For instance, clicking on a link to "Book now" may translate into INTENTION:confirmBooking. In addition, the client application 201 may send contextual information by prefixing each such semantic key-value input pairs by the keyword CONTEXT. In that case, the dialog manager 204 may treat this information as "contextual" and may consider it for default values, but not as explicit user input.

Some arrangements may permit natural language input to be accompanied by supplemental linguistic information, perhaps associated with an ongoing dialog with a current user or information specific to the current user. For example, the current user's contact list, additional configuration parameters, additional transform rules, or other supplemental linguistic information may accompany the natural language input. The supplemental linguistic information may be used by various components of the system 200 such as, for example, when processing natural language input, or when determining natural language output.

In some embodiments, client application 201 may also be configured to receive non-speech inputs from the user such as text strings inputted by a user using a keyboard, touchscreen, joystick, or another form of user input device at client application 201. The user may also respond to output prompts presented by selecting from touchscreen options presented by client application 201. The user input to such prompts may be processed by dialog manager 204, context sharing module 205, and NLU engine 203 in a similar manner as speech inputs received at client application 201.

Dialog manager 204 may continuously be monitoring for any speech input from a client application, independent of tasks implemented at the dialog manager. For example, dialog manager 204 may accept voice commands from a user even when any tasks currently being implemented do not require a user input. A task manager, implemented by the dialog manager 204, may process the voice command and in response to the voice command, launch a new task or modify the execution of one or more tasks currently being implemented.

Figure 3:
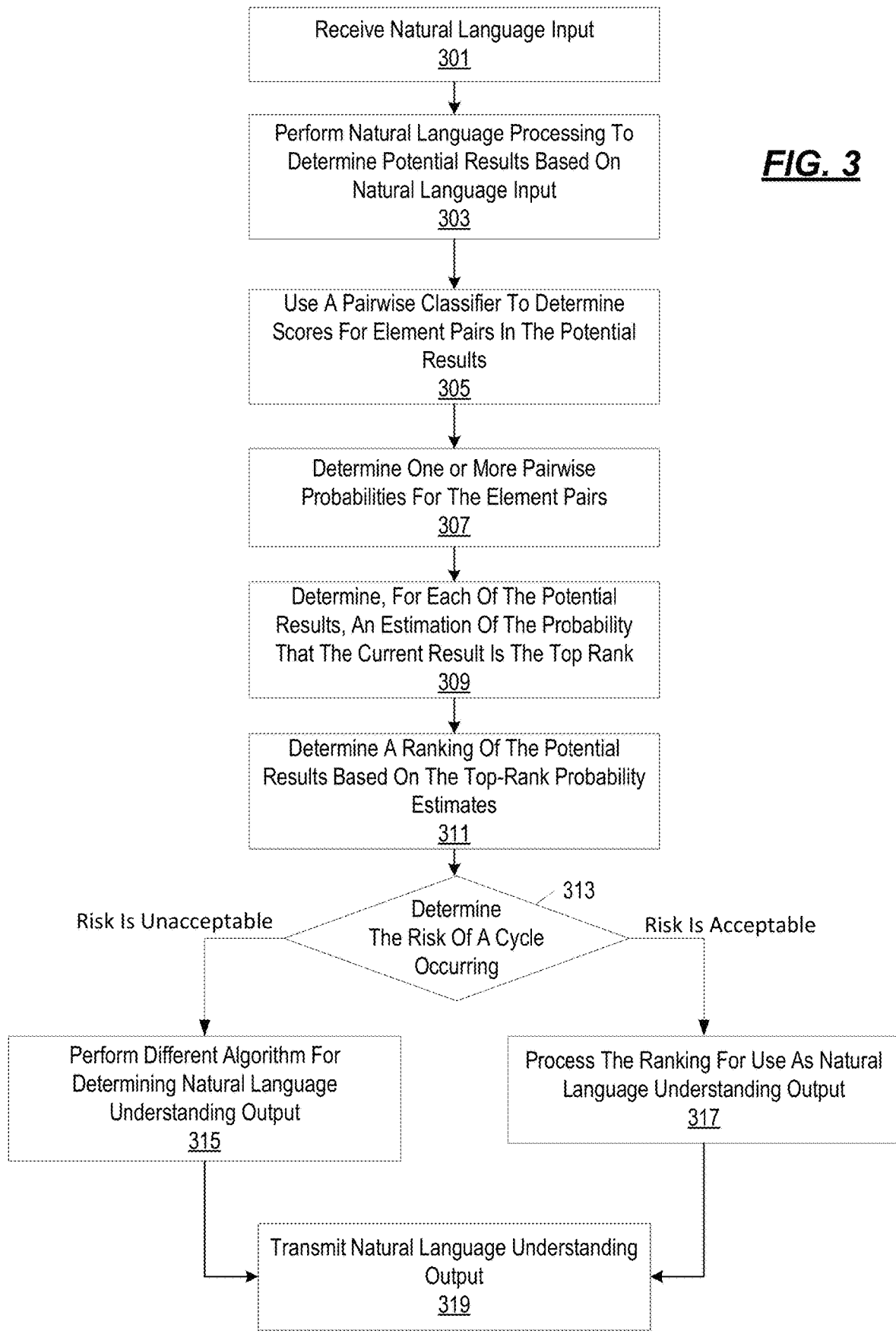
FIG. 3 depicts an illustrative method for determining a probabilistic or probability-based ranking for a natural language understanding system in accordance with various aspects described herein.

FIG. 3 depicts an illustrative method for determining a probabilistic or probability-based ranking for a natural language understanding system. In some arrangements, the steps depicted in the example method of FIG. 3 may be performed by one or more of the computing devices depicted in FIG. 1 and/or the natural language understanding system 200 of FIG. 2. For example, the steps depicted in the example method of FIG. 3 may be performed by the NLU engine 203 or ASR engine 202 of FIG. 2. In other arrangements, the steps depicted in the example method of FIG. 3 may be performed by a ranking engine, which could be added to system 200 as a new component and interconnected to any or all of the existing components of system 200.

Figure 4:
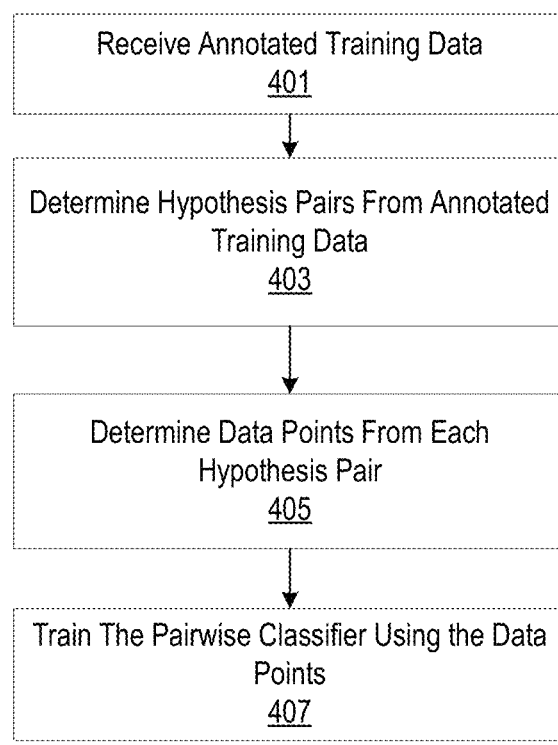
FIG. 4 depicts an illustrative method for preparing a pairwise classifier to determine scores in accordance with various aspects described herein.
Figure 5:
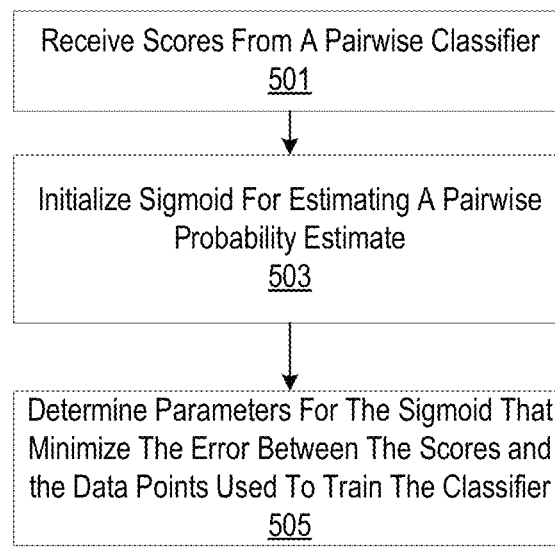
FIG. 5 depicts an illustrative method for processing scores to determine one or more pairwise probabilities in accordance with various aspects described herein.

Moreover, it is initially noted that additional details of the steps of FIG. 3 will be discussed in connection with the illustrative methods of FIGS. 4 and 5. For simplicity, the methods and steps illustrated throughout FIGS. 3-5 may be described as being performed by a computing device. The computing device that performs the methods and steps illustrated throughout FIGS. 3-5 may be any computing device suitable for receiving natural language input such as, for example, a desktop computing device, laptop computing device, tablet computing device, palmtop computing device, cellular telephone (e.g., a smartphone or feature phone), video game machine, television, set-top box, and other types of computing devices configured to receive natural language input and process that natural language input at a natural language processor. It is noted that although the methods and steps illustrated throughout FIGS. 3-5 are being described as being performed by a computing device, the various steps or methods could be performed by or distributed over plural computing devices, including, for example, the computing devices of FIG. 1 (e.g., computing devices 103, 105, 107 and 109), a component depicted in the system 200 of FIG. 2 (e.g., NLU engine 203 or ASR engine 202), or a component added to the system 200 of FIG. 2. In arrangements where the steps or methods illustrated in FIGS. 3-5 are performed by or distributed over plural computing devices, various communications over one or more networks (e.g., network 207 of FIG. 2) may be required to, for example, provide data from one computing device to another computing device.

Referring to FIG. 3, at step 301, a computing device may receive natural language input. In some arrangements, a user may provide natural language input to the computing device via a natural language input interface of the computing device (or a natural language input interface of the client application 201 of FIG. 2). Natural language input may be any form of natural language including speech, typed text, handwritten text, and manual gestures Accordingly, where the natural language input is speech, the natural language input interface may be a speech input interface that includes a microphone that generates an analog signal corresponding to the speech input received from a user and an analog-to-digital converter that converts the analog signal to a digital signal corresponding to the speech input. Where the natural language input is typed text, the natural language input interface may be a text input interface such as a physical keypad or keyboard, a touchscreen displaying a virtual keypad or keyboard, and other types of input means that allow selection of individual characters or words and generates a digital signal corresponding to those characters or words. Where the natural language input is handwritten input, the natural language input interface may include a touchscreen that receives strokes of a finger, stylus, or digital pen and an interpreter that converts those strokes into a digital signal representing individual characters or words. Where the typed input or handwritten input is applied to a physical document, the natural language input interface may include an image input device (such as a camera or scanner) that generates a digital image of the document and an interpreter that utilizes optical character recognition (OCR) technology to recognize individual characters or words in the digital image. Where the natural language is a signed language, the user may provide the natural language input as manual gestures. Where the natural language input includes manual gestures, the natural language input interface may include an image input device (such as a camera) that generates digital images of the gestures and an interpreter that processes the digital images of the gestures to recognize individual characters or words.

In some arrangements, the natural language input may be received in response to a request to process natural language text. For example, a request may be received by the computing device and the request may identify previously stored text that is to be processed. Accordingly, the computing device may retrieve the previously stored text and provide the text as natural language input for processing in order to, for example, generate natural language understanding output. In some arrangements, the text may include tagged data (e.g., generated by TE engine 208 and/or retrieved from database 210). Moreover, the request may identify one unit of text to process (e.g., one sentence) or multiple units of text to process as a batch job (e.g., multiple sentences). The multiple units may, in some example implementations, be processed asynchronously but sequentially.

At step 303, the computing device may determine potential results based on the natural language input. In some arrangements, this determination may be performed based on natural language processing performed by a natural language system, such as the one described in FIG. 2. For example, the determination of step 303 may be performed by the processes of an automatic speech recognition module and/or a natural language understanding module (e.g., ASR engine 202 and NLU engine 203).

Due to the ambiguous nature of language, most processes for natural language understanding determine a list of potential results. For example, if the natural language input is "Call Andy," the potential results could be a list of people that include the word "Andy." As another example, if the natural language input is "Find me bus tickets to Paris," the potential results could be a list of towns that include the word "Paris." The natural language processing may, in some arrangements, utilize additional information (e.g., contextual information and supplemental linguistic information, as described in connection with FIG. 2) when determining the potential results. For example, in the example where the natural language input is "Call Andy," the potential results could include a list of people that include the word "Andy" and that are included in a contact list of the current user. In the example where the natural language input is "Find me bus tickets to Paris," the potential results could be a list of towns that include the word "Paris" and are reachable by the current user via bus based on a geographic location of the user (e.g. if the current user is in Texas, the list may include the town of Paris, Tex., but not Paris, France).

Natural language understanding systems often determine natural language understanding output based on the potential results. To assist in determining the natural language understanding output, it may be helpful in some arrangements to determine which of the potential results is the best result for the natural language input, or to determine a ranked score of the potential results. The best result or the ranked score may be used when determining natural language output. This may be performed by scoring and/or ranking the potential results, and, based on the ranking and/or scoring, determining the natural language output. The remaining steps of FIG. 3 provide aspects related to scoring (e.g., scoring based on probabilities, or probabilistic scoring) and/or ranking (e.g., ranking based on probabilities, or probabilistic ranking) of the potential results, which, as will be described below, may form a basis for determining natural language understanding output for the natural language input.

At step 305, the computing device may use a pairwise classifier to determine scores for element pairs in the potential results. In some embodiments, the pairwise classifier may be a binary pairwise classifier that, for each pair of two elements in the potential results, produces one or more scores indicative of relationship between the two elements. For example, if the potential results includes three elements (e.g., A, B and C), a set of element pairs representative of the potential results may be determined (e.g., element pair (A, B), element pair (A, C) and element pair (B, C)). Each of the element pairs in the set may be provided to the pairwise classifier as input. In response to each input, the pairwise classifier may determine a score. Referring to the above example where the natural language input is "Call Andy," the binary pairwise classifier may determine scores for element pairs selected from the people listed in the potential results (e.g., one of the pairs including the elements Andy Smith and Andy Jones, which are two people found on the current user's contact list). Referring to the above example where the natural language input is "Find me bus tickets to Paris," the binary pairwise classifier may determine scores for pairwise elements selected from the potential destinations listed in the potential results (e.g., one of the pairs including the elements Paris, Tex. and Paris, France, which are two potential destinations that include the word "Paris").

There are numerous variations of pairwise classifiers that could be used to determine scores. For example, a pairwise classifier could be implemented using one or more support vector machines (SVMs) or other machine learning algorithm. Additional details related to one potential pairwise classifier that could be used to determine scores is described below in connection with FIG. 4.

Additionally, depending on the underlying algorithm of the classifier and/or the specific type of classifier used, the score determined by the classifier may or may not be probabilistic. For example, not all classifiers are probabilistic in nature and the scores they produce may represent some other information usable to sort or rank a list. For example, the score produced by some classifiers that implement an SVM may represent the signed distance to the SVM's hyperplane. Moreover, for those classifiers that are probabilistic in nature, the probability may be distorted based on the implementation of the classifier (e.g., if the classifier is trained using a small number of samples in the training data, or a non-representative set of training data). Accordingly, because aspects described herein relate to a probabilistic or probability-based ranking of potential results, further processing may be needed for the scores determined by the pairwise classifier to be representative of probabilities.

At step 307, the computing device may determine one or more pairwise probabilities based on the scores for the element pairs determined by the pairwise classifier. In some arrangements, each pairwise probability represent the probability that one element (e.g., element X) in the potential results is better than another element (e.g., element Y) in the potential results. For purposes of natural language understanding, element X being better than element Y may be understood as element X being more likely than element Y to be the intended meaning of the current user based on the natural language input and/or other available information (e.g., the geographic location discussed above).

For example, with respect to scores produced by pairwise classifiers, such as those described herein in connection with step 305 of FIG. 3, each score for an element pair may be processed through an algorithm in order to determine a corresponding pairwise probability. With respect to a score produced by a pairwise classifier for element pair (A, B), the score may be processed so that a pairwise probability is determined, which represents the probability that A is better than B. Accordingly, in the above example where the potential results includes three elements (A, B and C), the scores may be processed to determine pairwise probability estimates, which include the probability that A is better than B, P(A>B); the probability that B is better than C, P(B>C); and the probability that A is better than C, P(A>C). Referring to the above example where the natural language input is "Call Andy," the scores for the element pairs selected from the potential people to call may be processed to determine pairwise probability estimates corresponding to each score (e.g., one of the pairwise probabilities being the probability that Andy Smith is more likely than Andy Jones to be the person the current user intended to call). Referring to the above example where the natural language input is "Find me bus tickets to Paris," the scores for element pairs selected from the potential destinations may be processed to determine one or more pairwise probabilities corresponding to each score (e.g., one of the pairwise probabilities being the probability that Paris, Tex. is more likely than Paris, France to be the destination the person intends to travel by bus).

Determining a pairwise probability may be based on the type of classifier used and/or the type of score produced by the classifier. For example, in some arrangements, the classifier may produce a probabilistic score (e.g. some Bayesian classifiers), while in other arrangements, the classifier may produce a non-probabilistic score (e.g., a score indicating a distance to an SVM's hyperplane). In view of such differences in score types, the manner in which the scores can be processed to produce a pairwise probability may be dependent on the underlying algorithm used by the classifier. One example algorithm for processing scores to determine pairwise probability estimates is described below in connection with FIG. 5.

At step 309, the computing device may determine, for each of the potential results, an estimation of the probability that the current result is the top ranked, or best, result among the potential results. In other words, the probability estimate being determined at step 309 is the probability that a particular element in the potential results is the best choice given all the alternatives in the potential results. Such a probability, for a particular element, $I_i$, and a set of potential results, $N=\{I_1, \ldots, I_n\}$, can be denoted as:

$$P(\text{Rank}(I_i)=1|N)$$

Once each probability estimate or approximate has been determined, the elements may be sorted into a rank order by the obtained probability estimates. For simplicity and because the probability estimates being determined at step 309 relate to whether an element is at the top rank, the probability estimations determined at step 309 may be referred interchangeably herein as top-rank probability estimates or top-rank probability approximations.

There are a number of ways in which the probability that an element is the top-rank given all other alternatives could be determined. For our purposes, this disclosure will discuss how to determine such a probability based on the pairwise probability estimates described in connection with step 307. Additionally, some of the notation used in the below equations may be simplified for clarity.

One way to determine the probability that an element is the top-rank given all other alternatives is denoted by the following equation:

$$P(\text{Rank}(I_i)=1/|N)=\bigcap_{x!=I_i}^{N} P(I_i>x)$$

Another way to determine the probability that an element is the top-rank given all other alternatives is denoted by the following equations:

$$P(\text{Rank}(I_i) = 1 \mid N) = \sum_c P(\text{Rank}(I_i) = 1 \mid c) * P(c)$$

$$P(c) = \bigcap_{i=1}^{n-1} P(c_i > c_{i+1})$$

However, resolving the above equations requires conditional probabilities a natural language system is unlikely to have or be able to reasonably determine. For example, given three elements, A, B and C, the probability that A is the top rank given all other alternatives can be determined using any one of the following two equations:

$$P(\text{Rank}(A)=1|\{A,B,C\})=P(A>B)*P(A>C|A>B)$$

$$P(\text{Rank}(A)=1|\{A,B,C\})=P(A>B)*P(B>C|A>B)+P(A>C)*P(C>B|A>C)$$

As seen in the above-equations, conditional probabilities are needed to resolve the equations. However, the pairwise probability was previously determined at step 307. Accordingly, a number of simplifying assumptions may need to be performed to enable the estimation of the probability based on the pairwise probabilities.

One manner in which the probability, $P(\text{Rank}(I_i)=1|N)$, can be estimated or approximated is by determining the probability a first time under an assumption of complete independence, determining the probability a second time under an assumption of dependence, and then combining the two determined probabilities in some fashion (e.g., by averaging the two probabilities). For clarity, the following equations that illustrate this manner of estimating $P(\text{Rank}(I_i)=1|N)$ will use alternative notation: $P(\text{Rank}(N_x)=1|N)$, where Nx denotes an element in set N. Accordingly, under this notation, the probability that an element is the top rank given all other alternatives can be written as follows:

$$P(\text{Rank}(N_x) = 1 \mid N) = \prod_{i1=x}^{|N|} P(N_x > N_i \mid N_x > N_{(0\ldots x)-(i)})$$

Under the first assumption of independence, this equation can be rewritten as follows:

$$P(\text{Rank}(N_x) = 1 \mid N) \geq \prod_{i1=x}^{|N|} P(N_x > N_i)$$

Resolving this equation using the pairwise probability estimates determined at step 307 provides a lower bound to the top-rank probability estimate.

Under the second assumption of complete dependency, this equation can be rewritten as follows:

$$P(\text{Rank}(N_x) = 1 \mid N) \leq \min_{i \in N - \{N_x\}} (P(N_x > i))$$

Resolving this equation using the pairwise probability estimates determined at step 307 provides an upper bound to the top-rank probability estimate.

The determination of initial values for an upper bound, $R_{high}$, and lower bound, $R_{low}$, for the top-rank probability estimate (denoted as R(low, high)), can be written as follows:

$$P(\text{Rank}(N_x) = 1 \mid N) =$$

$$R(\text{low, high}) = \left[\prod_{j1=x}^{|N|} P(N_x > N_i), \min_{i \in N - \{N_x\}}(P(N_x > i))\right]$$

However, due to the nature of pairwise ranking, the real probability can be expected to fall closer to the dependent estimate and, as such, simply averaging might not produce a precise approximation. Optionally, once the upper and lower bound are initially determined, the range between the upper and lower bound can be restricted. For example, a pair of values, $(Z_1, Z_2)$, where $Z_1$ is less than or equal to $Z_2$, may be determined that optimizes a quality metric on a development data set. Once $(Z_1, Z_2)$ are found, the values may be applied to restrict the upper and lower bounds, as illustrated by the following equations, where $P'(\text{Rank}(N_x)=1|N)$ is the restricted range of the upper and lower bounds:

$$F_b(R) = R_{low} + B^*(R_{high} - R_{low})$$

$$P'(\text{Rank}(N_x)=1|N) = [F_{z1}(P(\text{Rank}(N_x)=1/|N)), F_{x2}(P(\text{Rank}(N_x)=1|N))]$$

The values of the upper and lower bounds may then be combined (e.g, by averaging) to determine the top-rank probability estimate.

Another manner in which the probability, $P(\text{Rank}(I_i)=1|N)$, can be estimated or approximated without the need for additional data is by a process in which we determine the initial values for $R_{low}$ and $R_{high}$ of all hypotheses, as described above, and then iteratively reduce the ranges from the initial values until all ranges are sufficiently small to ignore (or is at or below a threshold range) by applying on each range constraints inferred from the other ranges as described in the following paragraph.

In this manner, one simplifying assumption is that the potential results are without cycle (e.g., a sequence of (A>B), (B>C) and (C>A) is not possible) and/or the sum of the probabilities for all possible rankings is 1. Under this assumption, the probability of an element being at the top-rank given all other alternatives can be determined by the union of the probability of all rankings, c, where the element is at the top-rank:

$$P(\text{Rank}(I_i) = 1 \mid N) = \sum_c^{\binom{N}{n}} P(\text{Rank}(I_i) = 1 \mid c) * P(c)$$

Additionally, the probability that an element is better than another element, $P(I_i > I_x)$ is the union of all rankings where the element is ranked higher than the other element:

$$P(I_i > I_x) = \sum_c^{\binom{N}{n}} P(I_i > I_x \mid c) * P(c)$$

Accordingly, the equation for $P(\text{Rank}(I_i)=1|N)$ can be rewritten as follows a relation to the pairwise probability by removing from it the probabilities of the rankings where I1>I2 but I1 was not at the top rank:

$$P(\text{Rank}(I_i) = 1) = P(I_i > I_x) - \sum_c^{\binom{N}{n}} P(I_i > I_x \cap \text{Rank}(I_i) \neq 1 \mid c) * P(c)$$

The probability that an element is better than another element, $P(I_1 > I_2)$, was determined at step 307. Accordingly, the pairwise probabilities determined at step 307 can be used in the above equations. Thus, to resolve the above equation, P(c) may need to be determined or estimated. P(c) may be determined using the following equation:

$$P(c) = \prod_{i=1}^{|c|} P(c_i \mid c_o \ldots c_{i-1})$$

To estimate, or otherwise approximate, P(c), a simplifying assumption can be made that an element is only dependent on a previous element. Thus, P(c) can be estimated or approximated under such an assumption as follows:

$$P(c) \approx \prod_{i=0}^{|c|} P(c_i \mid c_{i-1}) \approx \prod_{i=1}^{|c|} P(c_{i-1} > c_i)$$

It is noted that the approximation can be considered fairly crude, but can be used as a starting point value for $P_{low}(c)$ and $P_{high}(c)$ which are respectively the lower and upper bounds of the estimated value of P(c).

The values $P_{low}(c)$ and $P_{high}(c)$ an be obtained from the above formulas for each c and then those values can be iteratively reduced in value until a particular condition is satisfied. For example, the reduction in range may be performed in accordance with the following equations:

$$S_{a,b} = \left\{ x \mid x \in \binom{N}{n} \cap \text{Rank}(a \text{ in } x) < \text{Rank}(b \text{ in } x) \right\}$$

$$P_{low}(c) = \min_{a,b \mid c \in S_{a,b}} \left( P(a > b) - \sum_x^{S_{a,b} - \{c\}} P_{high}(x) \right)$$

$$P_{high}(c) = \max_{a,b \mid c \in S_{a,b}} \left( P(a > b) - \sum_x^{S_{a,b} - \{c\}} P_{high}(x) \right)$$

The above equations can be used as a basis for adjusting the range of a ranking relatively to the other rankings that share a common attribute. For example, as illustrated in the above equations, the low bound of a ranking where a>b may be determined by subtracting the summed probability of a subset of all rankings from P(a>b). As illustrated in the above equations, the subset of all rankings is the set of rankings where the rank of a is less than the rank of b. The pair (a,b) is selected as such that, of all pairs of elements where a<b in c, the selected pair is the one that produces the lowest estimate. The high bound of a ranking where a<b may be determined in a similar manner but by seeking the pair (a,b) that produces the highest estimate. If a range for a particular ranking is adjusted, other ranges are also effected (e.g., because a ranking where a>b may also satisfy a restriction of a>c and b>c). Accordingly, the range can be reduced by adjusting the bounds as the range for other rankings change.

These ranking probabilities can then be used as a constraint relatively to the range of the probability at the top rank based on a formula discussed above:

$$P_{low}(\text{Rank}(I_i) = 1) = P(I_i > I_x) - \sum_c^{\binom{N}{n}} P(I_i > I_x \cap \text{Rank}(I_i) \neq 1 \mid c) * P_{high}(c)$$

$$P_{high}(\text{Rank}(I_i) = 1) = P(I_i > I_x) - \sum_c^{\binom{N}{n}} P(I_i > I_x \cap \text{Rank}(I_i) \neq 1 \mid c) * P_{low}(c)$$

Additionally, because the sum of the top rank of all elements should sum to 1, the following relationship between top rank probabilities ranges can be added:

$$P_{low}(\text{Rank}(I_i) = 1) = 1 - \sum_{x!=1}^{\binom{N}{n}} P_{high}(\text{Rank}(I_x) = 1)$$

$$P_{high}(\text{Rank}(I_i) = 1) = 1 - \sum_{x!=i}^{|N|} P_{low}(\text{Rank}(I_x) = 1)$$

Based on the above, a set of relationships between the various elements of our model can be defined where adjusting the range for one of the rankings or top rank probability may impact all other probability ranges. Accordingly, the range can be reduced by adjusting the bounds as the range for other rankings change.

For example, if our potential results include three elements (e.g., A, B and C) and if we have determined the initial values for the upper and lower bounds for the top-rank probability for each of elements A, B and C (e.g., the range that A is the top rank is 0.2-0.3, the range that B is the top-rank is 0.4-0.5, and the range that C is the top rank is 0.1-0.2), we may apply and adjust boundaries for each of the ranges to iteratively reduce each of the three ranges until a threshold condition is satisfied (e.g., the difference between successive iterations are within a threshold difference, which indicates the iterations are sufficiently stabilized, at least one of the ranges is within a threshold range, perform a particular number of iterations, etc.). Alternatively or additionally, after iterating to reduce the ranges, a development data set may be applied similar to the discussion above with respect to the first manner of estimating $P(\text{Rank}(I_i)=1|N)$ to further tune the ranges. In the previous example, the lower bound of $P(\text{Rank}(C)=1)$ could be increased to 0.2 while the estimate for A and B sum to 0.8. This new value could then be propagated to the rankings probability using the formula linking $P_{low}(\text{Rank}(I)=1)$ to $P_{high}(c)$. The new $P_{high}(c)$ value can then be used in the formula linking them to $P_{high}(c)$ and $P_{high}(\text{Rank}(I)=1)$ until the values stabilize.

Once the iteration and/or additional processing has been completed, the top-rank probability estimates may be determined. For example, if our potential results include three elements (e.g., A, B and C), the top-rank probability for each element may be determined based on the resulting ranges by, in some arrangements, applying a simple heuristic that combines the ranges into a single value for each top-rank estimated probability (e.g., by averaging the range for the probability that A is the top-rank, by averaging the range for the probability that B is the top-rank, and averaging the probability that C is the top-rank). At that point the gap between lower and upper bound should be sufficiently small such that that the heuristic used should have little impact on the final probability.

At step 311, the computing device may determine a ranking of the potential results based on the top-rank probability estimates. For example, the potential results may be sorted so that the element with the highest top-rank probability is first in the list and is followed by the element with the second highest top-rank probability, and so forth. For example, referring to the above example where the natural language input is "Call Andy," the potential results may be sorted so that the person determined to have the greatest top-rank probability estimate is first in the list (e.g., Andy Smith is sorted to be first in the list if the top-rank probability estimate for Andy Smith is greater than the top-rank probability estimate for Andy Jones). Referring to the above example where the natural language input is "Find me bus tickets to Paris," the potential results may be sorted so that the destination determined to have the greatest top-rank probability estimate is first in the list (e.g., Paris, Tex. is sorted to be first in the list if the top-rank probability estimate for Paris, Tex. is greater than the top-rank probability estimate for Paris, France).

At step 313, the computing device may perform a mechanism that determines the risk of a cycle occurring. Accordingly, the computing device may, based on a determination of the risk of a cycle occurring, select between processing the ranking of the potential results determined in step 311 as the natural language understanding output or performing a different algorithm (and/or model) for determining the natural language understanding output. As discussed above, the probability that an element is the top-ranked element given all other alternatives may be estimated or approximated under a number of simplifying assumptions. These assumptions cause an abstraction of the probability that a series of event lead to a cycle. A cycle occurs, for example, when the comparison of elements A and B results in A being the winner (e.g., ranked higher than B), when the comparison of elements B and C results in B being the winner, and when the comparison of elements A and C results in C being the winner.

To determine whether the risk of a cycle occurring is acceptable; a set of potential series of pairwise events leading to a cycle may be analyzed to determine their probabilities. The set of potential series of pairwise events may, in some variations, be the entire set of series of pairwise events. In some variations, however, the set of series of pairwise events may be a subset of the entire set (e.g., select series of pairwise events leading to a cycle involving the hypothesis at first rank). Once the set of series of pairwise events determined, each series may be analyzed to determine if it is invalid.

A series of pairwise events is invalid if it cannot produce a strict ordering. For example, if there are three elements A, B and C, there are three sets of elements to compare (A,B), (A,C) and (B,C). The series of event [(A>B), (B>C), X] involve A at the top rank. In such an example, the series where X=(A>C) can be considered valid while the series where X=(C, A) can be considered invalid.

When the set of invalid series of pairwise events is determined, an estimation of the probability that one of those series would occur may be determined. For clarity, these probabilities will be referred to as cycle probability estimates or cycle probability approximations. Determining the cycle estimates may be made similar to the discussion above in connection with determining the top-rank probability estimates and step 309. For example, the various events of a series can be considered as independent and the probability of this invalid series of events occurring can be estimated based on the product of the probability of the events composing it. Once the probability of each series of invalid events has been determined for each invalid ranking, these probabilities may be summed together (based on them being independent) and compared to a threshold, which may be relative to the top rank probability. If the sum of the invalid ranking probability estimates is greater than (and in some arrangements equal to) the threshold, it may be determined that the risk of a cycle is unacceptable and the computing device may select to proceed to step 315. If the sum of the invalid ranking probabilities is less than (and in some arrangements equal to) the threshold, it may be determined that the risk of cycle is acceptable and the computing device may select to proceed to step 317.

At step 315, conditioned upon determining that the risk of a cycle is unacceptable, the computing device may perform a different algorithm for determining natural language understanding output. For example, based on the risk of a cycle being unacceptable, the different algorithm may include a different ranking algorithm (e.g., a ranking algorithm that ranks according to results from a pointwise classifier, a ranking algorithm that ranks according to scores from a pairwise algorithm, a ranking algorithm that ranks according to results from a listwise classifier).

The different algorithm may include, in some embodiments, the processing of rankings from multiple ranking algorithms. For example, the different algorithm may perform one or more additional ranking algorithms and compare the rankings produced by the additional ranking algorithms to each other and/or the ranking determined at step 311. Based on the comparison, a final ranking may be determined (e.g., by selecting one of the rankings or combining the rankings into a combined ranking). The determination of the final ranking may be based on a weighted comparison of the rankings determined by the additional ranking algorithms and/or the ranking determined at step 311. In some variations, the cycle probability estimates determined at step 313 may be used to determine one of the weights in the weighted comparison. The different algorithm may process the final ranking or any other ranking that was determined for use as natural language understanding output (e.g., generate a list or ranking of one or more words for display based on a ranking, or generate a command to cause performance of a particular application function based on the ranking).

Various other types of natural language output may be determined by the different algorithm. For example, the different algorithm may include determining natural language output that requests additional input from a user (e.g., request the user to repeat what was said, request the user provide additional input, or request the user to confirm that one of the entries in the ranking of potential results is the intended item). The different algorithm may include determining natural language output that indicates an error occurred or using another statistical model.

At step 317, conditioned upon determining that the risk of cycle is acceptable, the computing device may process the ranking of the potential results for use as natural language output. Natural language output can take various forms depending on the natural language system, the natural language input, and the determined ranking. In some variations, for example, the ranking of the potential results may be used as natural language output that generates a list or ranking of one or more words for display. The ranking of potential results may be used to generate natural language output that is a command to cause performance of a particular application function based on the ranking.

For example, referring to the above example where the natural language input is "Call Andy," the ranking may be used to generate a display that lists Andy Smith as the first option to call and Andy Jones as the second option to call. The natural language output determined for this example may, in some variations, further cause the user to be queried for confirmation to call Andy Smith, or for the user to choose which person on the ranking to call. Referring to the above example where the natural language input is "Find me bus tickets to Paris," the ranking may be used to generate a display that lists bus tickets to Paris, Tex. The natural language output determined for this example may, in some variations, further cause the user to be queried for confirmation that the user wants to view bus tickets for Paris, Tex.; be queried for input identifying a particular departure date or time; and/or be queried for input identifying a particular departure bus station. There are numerous other types of natural language output that could be determined based on the ranking.

At step 319, the natural language understanding output may be transmitted. In some arrangements, the natural language understanding output may be transmitted to a client application (e.g., client application 201) that processes the output accordingly (e.g., display the output, perform the command indicated by the output, and/or continue the dialog with the user in accordance with the information of the output).

FIG. 4 depicts an illustrative method for preparing a pairwise classifier to determine scores in accordance with various aspects described herein. In particular, FIG. 4 illustrates a method for preparing a binary pairwise classifier suitable for use by the example method of FIG. 3.

At step 401, annotated training data may be received. For example, a binary pairwise classifier may be trained on annotated training data that associates an input, O, which may be either speech or text, to an optimal NLU result, G. This training data can be represented as follows:

$$TS=\{(O_1,G_1), \ldots (O_2,G_2)\}$$

Receiving the annotated training data may include retrieving the data from a storage medium or receiving a command to train the pairwise classifier that includes a pointer to location of the annotated training data.

At step 403, hypothesis pairs may be determined from the annotated training data. For example, a hypothesis pair, $(h_1, h_2)$, may be where both members, $h_1$ and $h_2$, are both generated on the same input O but where $h_1$ is better than $h_2$. The member $h_1$ may be determined to be better than $h_2$ where the difference in similarity of each member is bigger than a threshold, T. Determining that $h_1$ is better than $h_2$ may be determined according to the following equation:

$$\text{Pairs}=\{(h_1,h_2)|(O,G)\in TS, h_1\in \text{NLU}(O), h_2\in \text{NLU}(O),$$
$$\text{Similarity}(h_1,G)-\text{Similarity}(h_2,G)>T\}$$

At step 405, data points may be determined from each hypothesis pair. For example, each hypothesis pair may be used to determine two data points. For example, a first data point may be determined from a hypothesis pair, $(h_1, h_2)$, that associates a feature vector based on $(h_1, h_2)$ to the value 1.0 (which represents "A is better than B"). A second data point may be determined from the hypothesis pair, $(h_1, h_2)$, that associates the feature vector based on $(h_1, h_2)$ to the value 0.0 (which represents "B is better than A"). The data points determined from each hypothesis pair may be represented by the following equation:

$DP=\{(\text{features}(h_1,h_2),1.0|(h_1,h_2)\in\text{Pairs}\}\cup\{(\text{features}(h_2,h_1),0.0)|(h_1,h_2)\in\text{Pairs}\}$ At step 407, the pairwise classifier may be trained using the data points. Once trained, the pairwise classifier may be usable to, as described above in connection with FIG. 3, determine a score for elements pairs in the potential results.

FIG. 5 depicts an illustrative method for processing scores to determine pairwise probability in accordance with various aspects described herein. As discussed above in connection with step 307 of FIG. 3, further processing may be needed for the scores determined by a pairwise classifier to be representative of probabilities. The steps of FIG. 5 provide one example method for determining pairwise probability estimates from the scores of a pairwise classifier. To introduce the notation used by the equations described in connection with this Figure, a pairwise probability estimate can be represented as $P(I_1>I_2)$.

At step 501, scores from a pairwise classifier may be received. These scores may, in some variations, be output from a binary pairwise classifier.

At step 503, a sigmoid may be initialized for estimating a pairwise probability estimate. While the scores received at step 501 may or may not be probabilistic in nature, the score is likely to be strongly correlated to $P(I_1>I_2)$. In view of the correlation, $P(I_1>I_2)$ can be conditioned on the scores from the classifier, $P(I_1>I_2|\text{Score}=s)$, which can be estimated by fitting a sigmoid on the output of the training data. In some arrangements, the initialized sigmoid may be modeled using two parameters, A and B for controlling the step and center of the sigmoid. Estimating $P(I_1>I_2)$ by fitting a sigmoid of two parameters is illustrated in the following equation:

$$P(I_1>I_2)=Sig_{A,B}(A*\text{Score}+B)$$

At step 505, parameters for the sigmoid may be determined that minimize the error between the scores and the data points used to train the classifier. The minimization may be done according to the following equation:

$$SigDP = \{(\text{Score}, \text{Target}) | (\text{features}, \text{Target}) \in DP,$$
$$\text{Score} = BinaryPairwiseClassifier(\text{features})\}$$
$$\operatorname*{argmin}_{(A,B)} \sum_{i=0}^{|SigDP|} (Sig(A*\text{Score}_i + B) - \text{Target}_i)^2$$

Various features of the one or more embodiments described in connection with the above description and the accompanying figures may be implemented in any conventional computer programming language. For example, some embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Additionally, embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

Some embodiments may include the performance of one or more of the aspects described herein in a computer using computer hardware (such as a processor, domain-programmable gate array, or other electronic combinatorial logic, or similar device), which may be operating under control of software or firmware or a combination of any of these or operating outside control of any of the foregoing. One or more of the aspects described herein may be performed by active or passive electronic components, such as transistors or resistors. Furthermore, unless required otherwise, one or more of the aspects described herein may be implemented using more than one processor or more than one (single- or multi-processor) computer and it may be an instance of a computer program or an instance of a subset of the instructions of a computer program.

One or more aspects of the disclosure may be embodied in computer-usable data or computer-executable instructions, such as in one or more program modules, executed by one or more computers or other devices to perform the functions described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

The various methods, steps and other aspects described herein may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Although the subject matter has been described in language specific to structural features and/or methodological acts, it is to be understood that the subject matter defined in the appended statements is not necessarily limited to the specific features or acts described above. Rather, the specific features and acts described above are described as example implementations of the following statements.

The invention claimed is:

1. A method comprising:
receiving natural language input;
determining a list of potential results based on the natural language input;
determining, using a pairwise classifier, scores for element pairs determined from the list of potential results, each score being indicative of a relationship between two elements of the corresponding element pair;
determining, based on the scores for the element pairs, one or more pairwise probabilities for the elements pairs;
determining, based on the one or more pairwise probabilities for the element pairs, an approximation of a probability that each result in the list of potential results is to be the top ranked result among the list of potential results, resulting in top-rank probability approximations;
determining, based on the top-rank probability approximations, a ranking of the potential results; and
after determining the ranking of the potential results, transmitting natural language understanding output responsive to the natural language input.

2. The method of claim 1, further comprising:
determining a potential ranking for the potential results;
analyzing the potential ranking to determine whether a risk of a cycle occurring is acceptable or unacceptable; and
based on determining whether the risk of the cycle occurring is acceptable or unacceptable, selecting between processing the ranking of the potential results as the natural language understanding output or performing a different algorithm for determining the natural language understanding output.

3. The method of claim 2, further comprising: performing the different algorithm for determining the natural language understanding output, wherein performing the different algorithm includes determining a ranking using a classifier different from the pairwise classifier and/or generating a request for additional input from a user.

4. The method of claim 2, further comprising: processing the ranking of the potential results as the natural language understanding output.

5. The method of claim 2, further comprising:
determining whether at least one of the potential rankings is invalid and results in an identification of invalid rankings;
determining an estimation of a probability that each of one or more invalid rankings will occur, resulting in invalid ranking probability estimates; and
summing the invalid ranking probability estimates with each other, resulting in a sum of the invalid ranking probability estimates;
wherein selecting between processing the ranking of the potential results as the natural language understanding output or performing a different algorithm for determining the natural language understanding output is conditioned upon a comparison of the risk of the cycle occurring and a threshold.

6. The method of claim 5, further comprising:
determining an additional ranking based on a classifier different from the pairwise classifier; applying weights to the ranking of the potential results and the additional ranking, wherein at least one of the weights is based on the risk of the cycle occurring; and
based on the weights, the ranking of potential results and the additional ranking, determining a final ranking for use as the natural language output.

7. The method of claim 1, wherein determining, based on the one or more pairwise probabilities for the element pairs, the approximation of the probability that each result in the list of potential results is to be the top ranked result among the list of potential results comprises:
determining, for each probability that a result in the list of potential results is to be the top ranked result among the list of potential results, initial values for an upper bound and a lower bound, resulting in an upper bound and a lower bound for a first probability that a first result in the list of potential results is to be the top ranked result among the list of potential results and one or more other upper bounds and lower bounds for one or more other probabilities that one or more other results in the list of potential results is to be the top ranked result among the list of potential results; and
iteratively restricting a range between the upper bound and the lower bound for the first probability by applying a constraint inferred from ranges of the other upper bounds and the lower bounds.

8. An apparatus comprising:
one or more processors; and
memory storing executable instructions that, when executed by the one or more processors, cause the apparatus to:
receive natural language input;
determine a list of potential results based on the natural language input;
determine, using a pairwise classifier, scores for element pairs determined from the list of potential results, each score being indicative of a relationship between two elements of the corresponding element pair;
determine, based on the scores for the element pairs, one or more pairwise probabilities for the elements pairs;

determine, based on the one or more pairwise probabilities for the element pairs, an approximation of a probability that each result in the list of potential results is to be the top ranked result among the list of potential results, resulting in top-rank probability approximations; determine, based on the top-rank probability approximations, a ranking of the potential results; and after determining the ranking of the potential results, transmit natural language understanding output responsive to the natural language input.

9. The apparatus of claim 8, wherein the executable instructions, when executed by the one or more processors, further cause the apparatus to:

determine a potential ranking for the potential results;

analyze the potential ranking to determine whether a risk of a cycle occurring is acceptable or unacceptable; and based on determining whether the risk of the cycle occurring is acceptable or unacceptable, select between processing the ranking of the potential results as the natural language understanding output or performing a different algorithm for determining the natural language understanding output.

10. The apparatus of claim 9, wherein the executable instructions, when executed by the one or more processors, further cause the apparatus to: perform the different algorithm for determining the natural language understanding output, wherein performing the different algorithm includes determining a ranking using a classifier different from the pairwise classifier and/or generating a request for additional input from a user.

11. The apparatus of claim 9, wherein the executable instructions, when executed by the one or more processors, further cause the apparatus to: process the ranking of the potential results as the natural language understanding output.

12. The apparatus of claim 9, wherein the executable instructions, when executed by the one or more processors, further cause the apparatus to:

determine whether at least one of the potential rankings is invalid and results in an identification of invalid rankings;

determine an estimation of a probability that each of one or more invalid rankings will occur, resulting in invalid ranking probability estimates; and sum the invalid ranking probability estimates with each other, resulting in a sum of the invalid ranking probability estimates;

wherein causing the apparatus to select between processing the ranking of the potential results as the natural language understanding output or performing a different algorithm for determining the natural language understanding output is conditioned upon a comparison of the risk of the cycle occurring and a threshold.

13. The apparatus of claim 12, wherein the executable instructions, when executed by the one or more processors, further cause the apparatus to:

determine an additional ranking based on a classifier different from the pairwise classifier;

apply weights to the ranking of the potential results and the additional ranking, wherein at least one of the weights is based on the risk of the cycle occurring; and based on the weights, the ranking of potential results and the additional ranking, determine a final ranking for use as the natural language output.

14. The apparatus of claim 8, wherein causing the apparatus to determine, based on the one or more pairwise probabilities for the element pairs, the approximation of the probability that each result in the list of potential results is to be the top ranked result among the list of potential results comprises causing the apparatus to:

determine, for each probability that a result in the list of potential results is to be the top ranked result among the list of potential results, initial values for an upper bound and a lower bound, resulting in an upper bound and a lower bound for a first probability that a first result in the list of potential results is to be the top ranked result among the list of potential results and one or more other upper bounds and lower bounds for one or more other probabilities that one or more other results in the list of potential results is to be the top ranked result among the list of potential results; and iteratively restrict a range between the upper bound and the lower bound for the first probability by applying a constraint inferred from ranges of the other upper bounds and the lower bounds.

15. One or more computer-readable media storing executable instructions that, when executed cause an apparatus to:

receive natural language input;

determine a list of potential results based on the natural language input;

determine, using a pairwise classifier, scores for element pairs determined from the list of potential results, each score being indicative of a relationship between two elements of the corresponding element pair;

determine, based on the scores for the element pairs, one or more pairwise probabilities for the elements pairs;

determine, based on the one or more pairwise probabilities for the element pairs, an approximation of a probability that each result in the list of potential results is to be the top ranked result among the list of potential results, resulting in top-rank probability approximations;

determine, based on the top-rank probability approximations, a ranking of the potential results; and after determining the ranking of the potential results, transmit natural language understanding output responsive to the natural language input.

16. The one or more computer-readable media of claim 15, wherein the executable instructions, when executed, further cause the apparatus to:

determine a potential ranking for the potential results;

analyze the potential ranking to determine whether a risk of a cycle occurring is acceptable or unacceptable; and based on determining whether the risk of the cycle occurring is acceptable or unacceptable, select between processing the ranking of the potential results as the natural language understanding output or performing a different algorithm for determining the natural language understanding output.

17. The one or more computer-readable media of claim 16, wherein the executable instructions, when executed, further cause the apparatus to:

perform the different algorithm for determining the natural language understanding output, wherein performing the different algorithm includes determining a ranking using a classifier different from the pairwise classifier and/or generating a request for additional input from a user.

18. The one or more computer-readable media of claim 16, wherein the executable instructions, when executed, further cause the apparatus to: process the ranking of the potential results as the natural language understanding output.

19. The one or more computer-readable media of claim 16, wherein the executable instructions, when executed, further cause the apparatus to:
- determine whether at least one of the potential rankings is invalid and results in an identification of invalid rankings;
- determine an estimation of a probability that each of one or more invalid rankings will occur, resulting in invalid ranking probability estimates; and
- sum the invalid ranking probability estimates with each other, resulting in a sum of the invalid ranking probability estimates;
- wherein causing the apparatus to select between processing the ranking of the potential results as the natural language understanding output or performing a different algorithm for determining the natural language understanding output is conditioned upon a comparison of the risk of the cycle occurring and a threshold.

20. The one or more computer-readable media of claim 19, wherein the executable instructions, when executed by the one or more processors, further cause the apparatus to:
- determine an additional ranking based on a classifier different from the pairwise classifier;
- apply weights to the ranking of the potential results and the additional ranking, wherein at least one of the weights is based on the risk of the cycle occurring; and
- based on the weights, the ranking of potential results and the additional ranking, determine a final ranking for use as the natural language output.

* * * * *